United States Patent
Song (10) Patent No.: US 7,961,788 B2
(45) Date of Patent: Jun. 14, 2011

(54) METHOD AND APPARATUS FOR VIDEO ENCODING AND DECODING, AND RECORDING MEDIUM HAVING RECORDED THEREON A PROGRAM FOR IMPLEMENTING THE METHOD

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 11/371,105

(22) Filed: Mar. 9, 2006

(65) Prior Publication Data

US 2007/0009030 A1    Jan. 11, 2007

(30) Foreign Application Priority Data

Jul. 8, 2005  (KR) .................. 10-2005-0061780

(51) Int. Cl.
*H04N 7/12* (2006.01)
*H04B 1/66* (2006.01)
(52) U.S. Cl. .......... 375/240.12; 375/240.27; 375/240.01
(58) Field of Classification Search ............. 375/240.12, 375/240.27, 240.26, 240.01, 240
See application file for complete search history.

(56) References Cited

U.S. PATENT DOCUMENTS

| 2003/0128762 A1* | 7/2003 | Nakagawa et al. ...... 375/240.16 |
| 2004/0151253 A1* | 8/2004 | Bossen .......................... 375/243 |
| 2004/0157560 A1* | 8/2004 | Yamasaki .................... 455/63.1 |

FOREIGN PATENT DOCUMENTS

| JP | 11-75198 A | 3/1999 |
| KR | 2003-0015492 A | 2/2003 |
| KR | 2003-0025285 A | 3/2003 |
| KR | 10-2005-0004112 A | 1/2005 |

* cited by examiner

*Primary Examiner* — David C. Payne
*Assistant Examiner* — Brian J Stevens
(74) *Attorney, Agent, or Firm* — Sughrue Mion, PLLC (57) ABSTRACT

A video encoding method includes generating a primary error image by performing motion estimation and compensation on a current frame with reference to a previous frame, generating a secondary error image by performing motion estimation and compensation on the primary error image of the generated current frame with reference to an error image of the previous frame. The error image of the previous frame is obtained by performing motion estimation and motion compensation on the previous frame when the previous frame is encoded.

10 Claims, 9 Drawing Sheets

METHOD AND APPARATUS FOR VIDEO ENCODING AND DECODING, AND RECORDING MEDIUM HAVING RECORDED THEREON A PROGRAM FOR IMPLEMENTING THE METHOD

CROSS-REFERENCE TO RELATED PATENT APPLICATION

This application claims priority from Korean Patent Application No. 10-2005-0061780, filed on Jul. 8, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to video encoding and decoding, and more particularly, to video encoding and decoding, in which an encoding technique for improving video compression efficiency is adopted.

2. Description of the Related Art

With the emergence of digital televisions and digital versatile disc (DVD) video players, broadcasting services and home entertainment services are changing significantly. Various application services provided by the broadcasting services and the home entertainment services are becoming available through the standardization of video compression techniques. Video Compression technique standards include Moving Picture Experts Group (MPEG)-2, MPEG-4, H.264, and VC1. However, to provide a video service having higher quality and lower bit rate, there is a need for an improved compression technique that improves conventional compression efficiency.

Figure 1:
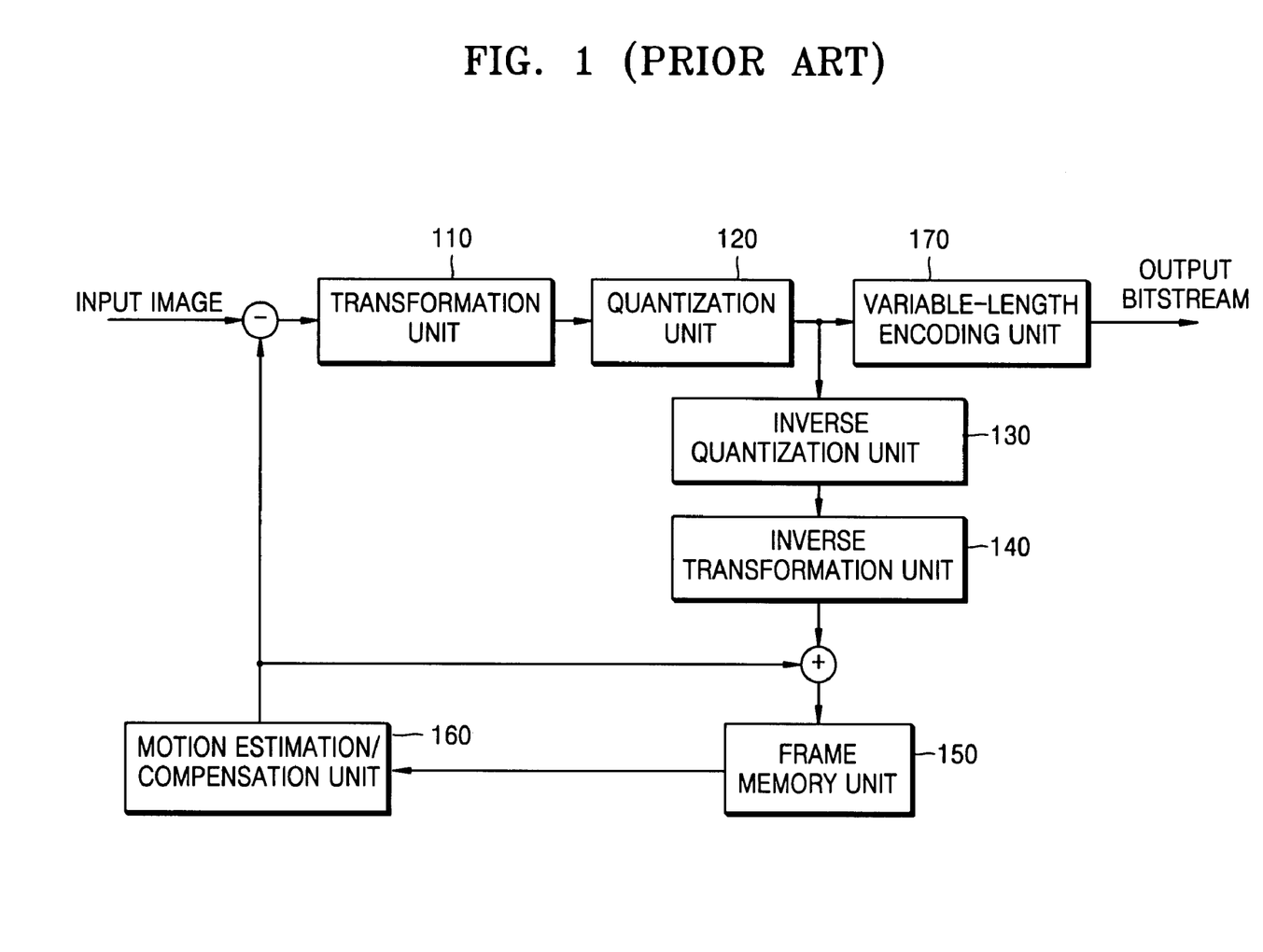
FIG. 1 is a block diagram of a general video encoder.
Figure 2:
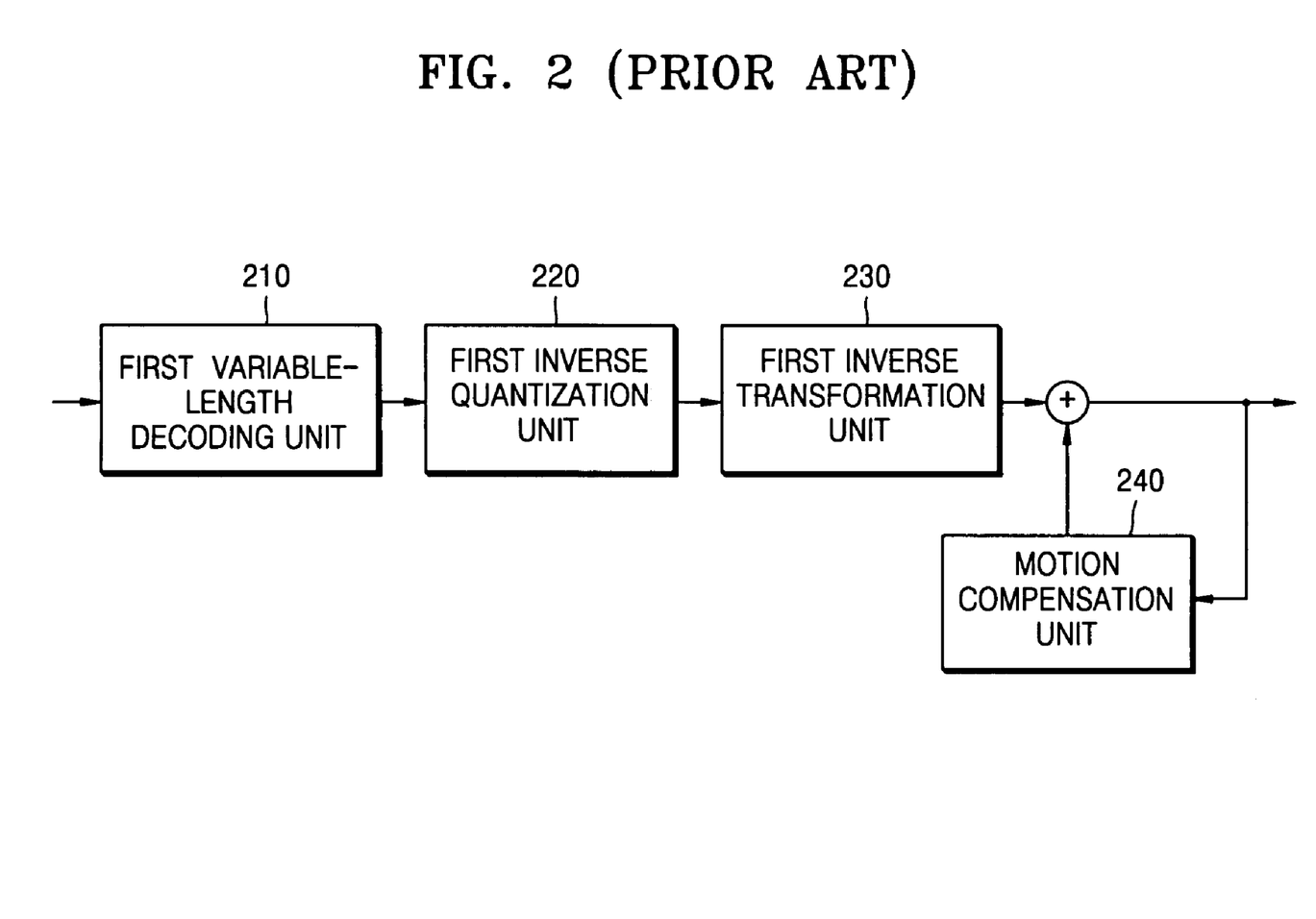
FIG. 2 is a block diagram of a video decoder corresponding to the video encoder of FIG. 1.
Figure 3:
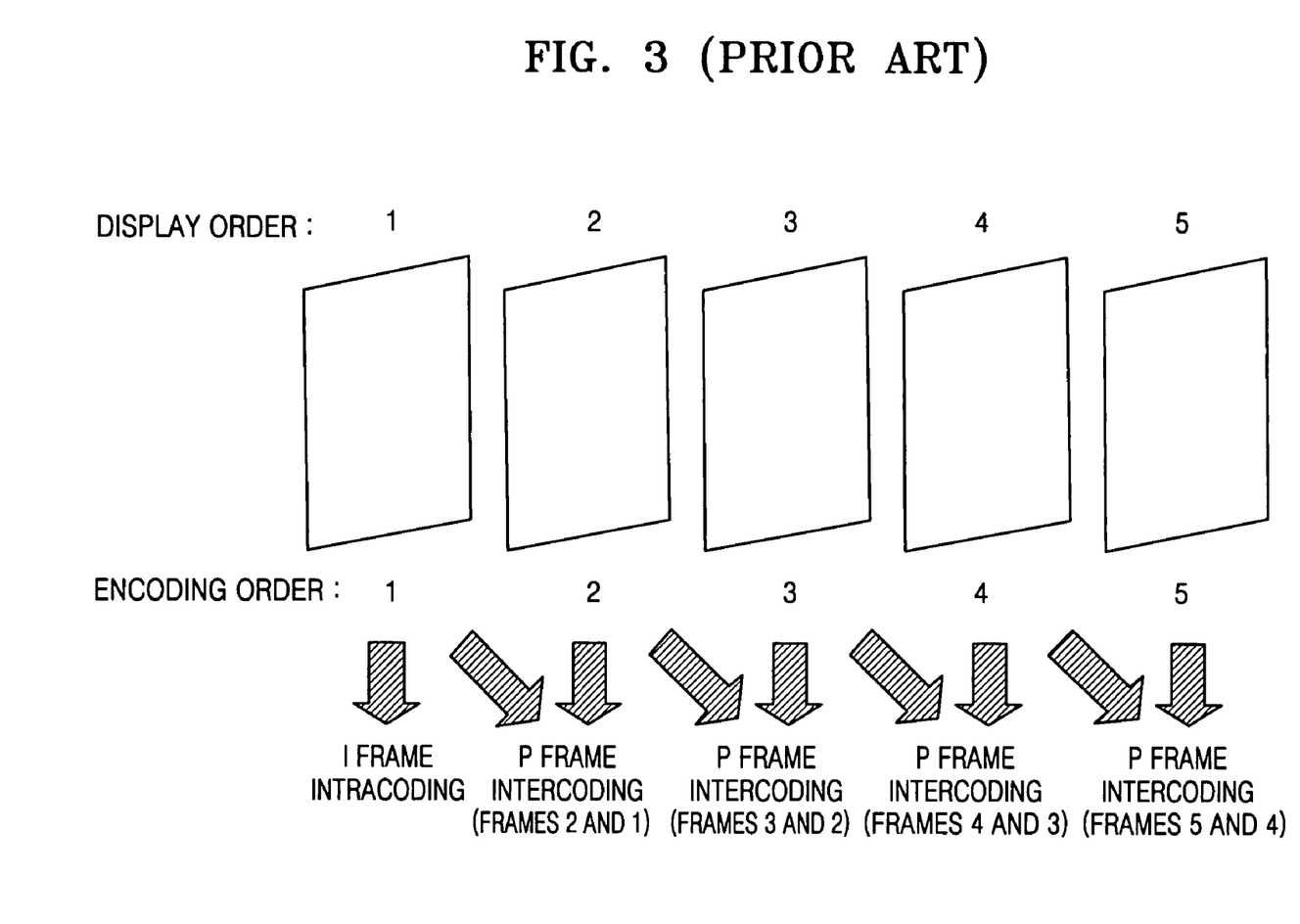
FIG. 3 is a view for explaining a conventional encoding method.

FIGS. 1 through 3 are views for explaining a conventional method for video compression and decoding.

FIG. 1 is a block diagram of a general video encoder.

A discrete cosine transform (DCT) unit 110 performs DCT on image data that is input in units of 8×8 blocks, in order to remove spatial correlation. A quantization (Q) unit 120 performs quantization on DCT coefficients generated by the DCT unit 110 to express the DCT coefficients with several representative values, thereby performing high-efficiency low-loss compression.

An inverse quantization (IQ) unit 130 performs IQ on the image data quantized by the quantization unit 120. An inverse DCT (IDCT) unit 140 performs IDCT on the image data that is inversely quantized by the IQ unit 130. A frame memory 150 stores the image data that is inversely discrete cosine transformed by the IDCT unit 140 in frame units.

A motion estimation and compensation (ME/MC) unit 160 estimates a motion vector (MV) per macroblock and a sum of absolute differences (SAD) corresponding to a block matching error using video data of an input current frame and video data of a previous frame stored in the frame memory 150.

A variable length encoding (VLC) unit 170 removes statistical redundancy from DCT transformed and quantized data. Such a video encoder is disclosed in U.S. Pat. No. 6,480,539.

FIG. 2 is a block diagram of a video decoder corresponding to the video encoder of FIG. 1.

The video decoder receives a bitstream encoded by the video encoder. A first variable-length decoding unit performs variable-length decoding on the received bitstream. A first IQ unit 220 and a first IDCT unit 230 perform IQ and IDCT on the decoded bitstream. Decoding is performed using reference picture information that is motion-compensated by a motion compensation (MC) unit 240 or intrapredicted by an intraprediction unit (not shown).

Conventional video compression techniques, e.g., well-known codecs such as MPEG-2, H.264, and VC1, are based on block-unit MC-DCT methods. For example, since all macroblocks of a first I frame of a group of pictures (GOP) have intra modes, they are intracoded. Since each macroblock of the following P frames has an intra or inter mode, a macroblock having an intra mode is encoded in the same manner as a macroblock of the I frame having an intra mode. On the other hand, in the case of a macroblock of a P frame having an inter mode, only an MV and differential information obtained by motion estimation and MC on an adjacent I frame or P frame are transmitted after being encoded.

FIG. 3 is a conventional encoding method where video data to be encoded has a GOP with an IPPP structure.

Intra encoding is performed on the first I frame (frame 1). The following P frame (frame 2) is inter-encoded by referring to the I frame (frame 1) that is already encoded and decoded. In the case of a P frame, each macroblock can have an inter or intra mode, but inter encoding is performed on most P frames. The following P frame (frame 3) is inter-encoded by referring to the P frame (frame 2) that is already encoded and decoded. The following P frame (frame 4) is inter-encoded by referring to the P frame (frame 3) that is already encoded and decoded.

Intraprediction for intra-encoding used in video encoding of FIG. 3 uses various predictive compression methods such as AC prediction of VC1 or intraprediction of H.264. However, there is a still need to improve intra compression efficiency. Moreover, although interprediction for inter-encoding uses a multiple reference motion compensation method as in H.264, inter compression efficiency needs to be improved.

SUMMARY OF THE INVENTION

The present invention provides a method and apparatus for video encoding and decoding, in which video encoding and decoding efficiencies are improved by performing motion estimation and compensation on error images obtained by motion estimation and compensation.

According to an aspect of the present invention, there is provided a video encoding method. The video encoding method includes generating a primary error image by performing motion estimation and compensation on a current frame with reference to a previous frame and generating a secondary error image by performing motion estimation and compensation on the primary error image of the current frame with reference to an error image of the previous frame. The error image of the previous frame is obtained by performing motion estimation and compensation on the previous frame when the previous frame is encoded.

The generating of the primary error image may include performing first encoding on the generated primary error image and performing a first decoding corresponding to the first encoding on the encoded primary error image, and the of generating the secondary error image may include performing motion estimation and compensation on the primary error image that passes through the first decoding with reference to the error image of the previous frame.

The video encoding method may further include entropy-encoding the generated secondary error image, a first motion vector obtained in the generating of the primary error image, and a second motion vector obtained in the generating of the secondary error image.

The video encoding method may further include selectively entropy-encoding a first motion vector obtained in the generating of the primary error image and the primary error image or the first motion vector obtained in the generating of the primary error image, a second motion vector obtained in the generating of the secondary error image, and the secondary error image.

The selective entropy-encoding may be performed based on a sum of the first motion vector obtained in the generating of the primary error image and the amount of data of the primary error image and a sum of the first motion vector obtained in the generating of the primary error image, the second motion vector obtained in the generating of the secondary error image, and the amount of data of the secondary error image.

According to another aspect of the present invention, there is provided a video encoder including a primary error image generating unit and a secondary error image generating unit. The primary error image generating unit generates a primary error image by performing motion estimation and compensation on a current frame with reference to a previous frame. The secondary error image generating unit generates a secondary error image by performing motion estimation and compensation on the primary error image of the current frame with reference to an error image of the previous frame. The error image of the previous frame is obtained by performing motion estimation and compensation on the previous frame when the previous frame is encoded.

The primary error image generating unit may include a first encoding unit performing first encoding on the primary error image and a first decoding unit performing first decoding corresponding to the first encoding on the encoded primary error image, and the secondary error image generating unit may include a second encoding unit generating the secondary error image by performing motion estimation and compensation on the primary error image that passes through the first decoding with reference to the error image of the previous frame.

The primary encoding unit may include a first transformation unit performing predetermined transformation and a first quantization unit performing quantization.

The video encoder may further include an entropy encoding unit entropy-encoding the secondary error image, a first motion vector obtained in the generation of the primary error image, and a second motion vector obtained in the generation of the secondary error image.

The video encoder may further include an entropy-encoding unit selectively entropy-encoding a first motion vector obtained in the generation of the primary error image and the primary error image or the first motion vector obtained in the generation of the primary error image, a second motion vector obtained in the generation of the secondary error image, and the secondary error image.

The entropy-encoding unit may selectively perform the entropy-encoding based on a sum of the first motion vector obtained in the generation of the primary error image and the amount of data of the primary error image and a sum of the first motion vector obtained in the generation of the primary error image, the second motion vector obtained in the generation of the secondary error image, and the amount of data of the secondary error image.

According to still another aspect of the present invention, there is provided a video decoding method. The video decoding method includes adding an error image of a motion estimated and compensated previous frame to a secondary error image of an entropy-decoded current frame to reconstruct a primary error image of the current frame, and adding the motion estimated and compensated previous frame to the reconstructed primary error image of the current frame to generate a reconstructed current frame. The primary error image is generated by performing motion estimation and compensation on the current frame with reference to the previous frame and the secondary error image is generated by performing motion estimation and compensation on the generated primary error image when the previous frame is encoded.

The generation of the primary error image of the current frame may include entropy-decoding the primary error image of the previous frame, performing first decoding on the primary error image of the entropy-decoded previous frame, storing the primary error image of the previous frame that passes through the first decoding, performing second decoding on the secondary error image that is entropy-decoded, and performing motion estimation and compensation on the error image of the previous frame stored after the first decoding and adding the motion estimated and compensated error image of the previous frame to the secondary error image that passes through the second decoding.

The first decoding may include performing first inverse quantization and performing first inverse transformation on an image that passes through the first inverse quantization and the second decoding comprises performing second inverse quantization, and performing second inverse transformation on an image that passes through the second inverse quantization.

The video decoding method may further include entropy-decoding an input bitstream and extracting mode information and determining whether to performing the first decoding or the second decoding on the entropy-decoded bitstream based on the extracted mode information.

According to yet another aspect of the present invention, there is provided a video decoder including a primary error image reconstructing unit and an image reconstructing unit. The primary error image reconstructing unit adds an error image of a motion estimated and compensated previous frame to a secondary error image of an entropy-decoded current frame to reconstruct a primary error image of the current frame. The image reconstructing unit adds the motion estimated and compensated previous frame to the reconstructed primary error image of the current frame to generate a reconstructed current frame. The primary error image is generated by performing motion estimation and compensation on the current frame with reference to the previous frame and the secondary error image is generated by performing motion estimation and compensation on the generated primary error image when the previous frame is encoded.

The primary error image reconstructing unit may further include a first decoding unit entropy-decoding the primary error image of the previous frame and performing first decoding on the primary error image of the entropy-decoded previous frame, a first storing unit storing the primary error image of the previous frame that passes through the first decoding, a second decoding unit performing second decoding on the secondary error image that is entropy-decoded, and a secondary error image reconstructing unit performing motion estimation and compensation on the error image of the previous frame stored after the first decoding and adding the motion estimated and compensated error image of the previous frame to the secondary error image that passes through the second decoding.

The first decoding unit may include a first inverse quantization unit performing a first inverse quantization and a first inverse transformation unit performing first inverse transformation on an image that passes through the first inverse quantization and the second decoding unit may include a second inverse quantization unit performing a second inverse quantization and a second inverse transformation unit performing a second inverse transformation on an image that passes through the second inverse quantization.

The video decoder may further include a mode information extracting unit entropy-decoding an input bitstream and extracting mode information and a mode determining unit determining whether to perform a first decoding or a second decoding on the entropy-decoded bitstream based on the extracted mode information.

According to yet another aspect of the present invention, there is provided a computer-recordable recording medium having recorded thereon a program for implementing a video encoding method. The video encoding method includes generating a primary error image by performing motion estimation and compensation on a current frame with reference to a previous frame of the current frame, and generating a secondary error image by performing motion estimation and compensation on the primary error image of the current frame with reference to an error image of the previous frame. The error image of the previous frame is obtained by performing motion estimation and compensation on the previous frame when the previous frame is encoded.

According to yet another aspect of the present invention, there is provided a computer-recordable recording medium having recorded thereon a program for implementing a video decoding method. The video decoding method includes adding an error image of a motion estimated and compensated previous frame to a secondary error image of an entropy-decoded current frame to reconstruct a primary error image of the current frame and adding the motion estimated and compensated previous frame to the reconstructed primary error image of the current frame to generate a reconstructed current frame. The primary error image is generated by performing motion estimation and compensation on the current frame with reference to the previous frame and the secondary error image is generated by performing motion estimation and compensation on the generated primary error image when the previous frame is encoded.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF EXEMPLARY EMBODIMENTS OF THE INVENTION

Figure 4:
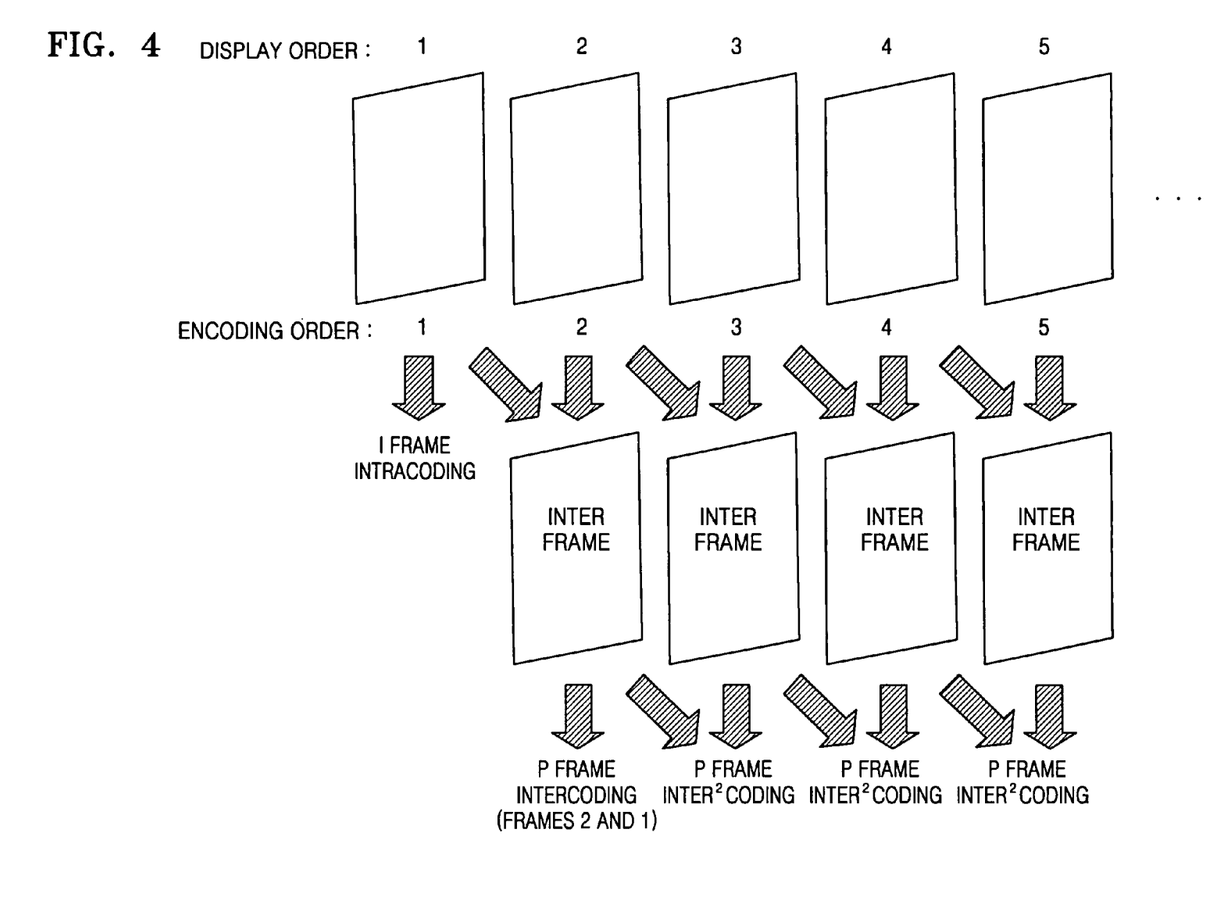
FIG. 4 is a view for explaining an encoding method according to an exemplary embodiment of the present invention.

FIG. 4 is a view for explaining an encoding method according to an exemplary embodiment of the present invention.

For convenience of explanation, a group of pictures (GOP) with an IPPP structure will be referred to.

Conventional intra-encoding is performed on the first I frame (frame 1). Conventional inter-encoding is performed on a P frame (frame 2) following the I frame (frame 1) by referring to the I frame (frame 1) that is already encoded and decoded, thereby obtaining an interframe 2.

Next, encoding according to the present invention is performed on a P frame (frame 3) following the P frame (frame 2). First, inter-encoding is performed on the P frame (frame 3) by referring to the P frame (frame 2) that is already encoded and decoded, thereby obtaining an inter-interframe 3.

Thereafter, motion estimation and compensation are performed on the obtained interframe 3 by referring to the interframe 2 obtained by performing inter-encoding on the P frame (frame 2), thereby obtaining an inter-interframe 3. In other words, motion compensation discrete cosine transform (MC-DCT) is performed once more on each macroblock of the interframe 3 by referring to the interframe 2.

As such, MC-DCT is performed twice on the frame 3 in units of macroblocks and the finally obtained inter-interframe 3 is encoded in units of macroblocks and is then transmitted. At this time, minimal data to be transmitted includes error data of the inter-interframe 3, a motion vector when the interframe 3 is obtained, and a motion vector when the inter-interframe 3 is obtained.

Since the finally obtained inter-interframe 3 requires two motion vectors in some cases, the amount of data transmitted may be greater than when the interframe 3 is encoded and then transmitted. Thus, in an encoding unit, the amounts of data to be transmitted are compared, one of data of the inter-interframe 3 and data of the interframe 3 is transmitted based on the result of comparison, and mode information indicating the type of transmitted data is transmitted. The mode information may be generated and transmitted in units of macroblocks. Alternatively, mode information may be generated and transmitted in units of blocks of a predetermined size.

The mode information may be selectively added to a bitstream and then transmitted to a decoding unit.

Such encoding stated above may be applied to the following P frames (frames 4 and 5).

Figure 5:
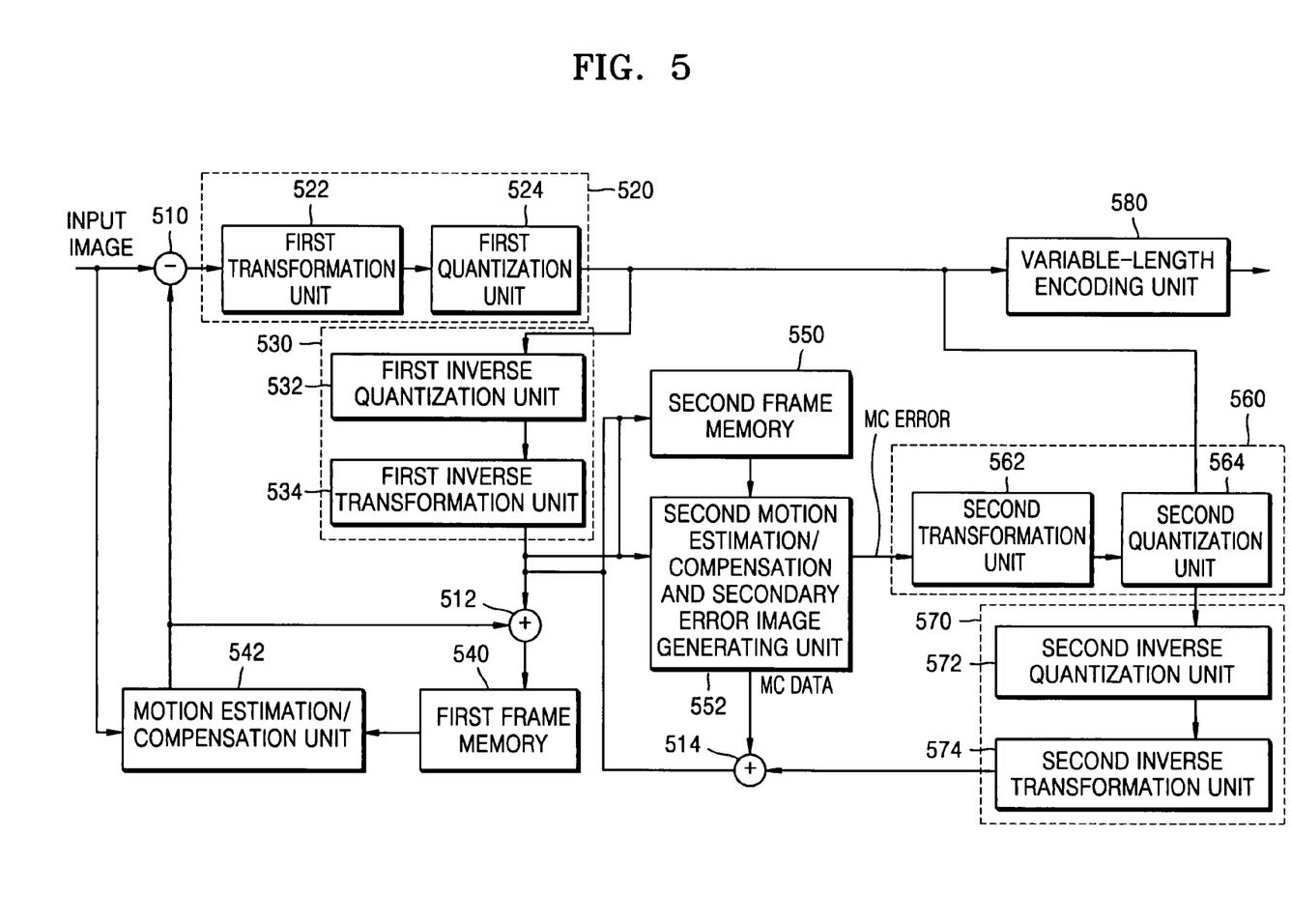
FIG. 5 is a block diagram of a video encoder according to an exemplary embodiment of the present invention.

FIG. 5 is a block diagram of a video encoder according to an exemplary embodiment of the present invention.

The video encoder includes a subtraction unit 510, a first encoding unit 520, a first decoding unit 530, a first adding unit 512, a first frame memory 540, a first motion estimation/compensation unit 542, a second frame memory 550, a second motion estimation/compensation and secondary error image generating unit 552, a second encoding unit 560, a second decoding unit 570, a second adding unit 514, and a variable-length encoding unit 580. The first encoding unit 520 includes a first transformation unit 522 and a first quantization unit 524. The first decoding unit 530 includes a first inverse quantization unit 532 and a first inverse transformation unit 534. The second encoding unit 560 includes a second transformation unit 562 and a second quantization unit 564. The second decoding unit 570 includes a second inverse quantization unit 572 and a second inverse transformation unit 574.

Since the subtraction unit 510, the first transformation unit 522, the second transformation unit 562, the first inverse quantization unit 532, the first inverse transformation unit 534, the first adding unit 512, the first frame memory 540, and the first motion estimation/compensation unit 542 of FIG. 5 function in the same way as corresponding functional units of the general video encoder of FIG. 1, an explanation thereof will not be given. For example, the first transformation unit 522, the second transformation unit 562, the first inverse quantization unit 532, and the first inverse transformation unit 534 may be functional units of an encoder using a predetermined codec, e.g., MPEG-2, H.264, VC1, and MPEG-4.

In the following description, a case where an input image has a GOP structure with an IPPP structure as shown in FIG. 4, i.e., the input image includes $I_1$, $P_2$, $P_3$, $P_4$, and $P_5$ frames will be taken as an example.

A conventional intra-encoding unit (not shown) performs intra-encoding on the $I_1$ frame, thereby obtaining a differential image. The first transformation unit 522 and the first quantization unit 524 perform transformation and quantization on the differential image, thereby generating an image $I^e_1$. The first inverse quantization unit 532 and the first inverse transformation unit 534 perform inverse quantization and inverse transformation on the generated image $I^e_1$. The resultant image passes through the first adding unit 512, thereby generating a reconstructed image $I_1$, i.e., an $I^r_1$ image. The generated image $I^r_1$ is stored in the first frame memory 540. The image $I^e_1$ generated through intra-encoding is input to the variable-length encoding unit 580.

Motion estimation and compensation are performed on the following $P_2$ frame (frame 2) by referring to the I frame that is already encoded and decoded and stored in the first frame memory 540, i.e., the image $I^r_1$, thereby generating an error image. The first transformation unit 522 and the first quantization unit 524 perform transformation and quantization on the generated error image, thereby generating an image $P^e_2$. The first inverse quantization unit 532 and the first inverse transformation unit 534 perform inverse quantization and inverse transformation on the generated image $P^e_2$. The resultant image passes through the first adding unit 512, thereby generating a reconstructed image $P_2$, i.e., an image $P^r_2$. The generated image $P^r_2$ is stored in the first frame memory 540. The image $P^e_2$ generated through inter-encoding is input to the variable-length encoding unit 580. The first inverse quantization unit 532 and the first inverse transformation unit 534 perform first inverse quantization and first inverse transformation on the image $P^e_2$ generated through inter-encoding, thereby generating an image $P^{e'}_2$. The generated image $P^{e'}_2$ is stored in the second frame memory 550.

Next, encoding according to the present invention is applied to the $P_3$ frame. First, the first motion estimation/compensation unit 542 performs motion estimation and compensation on the $P_3$ frame by referring to the image $P^r_2$ stored in the first frame memory 540, thereby generating an error image. The first transformation unit 522 and the first quantization unit 524 perform transformation and quantization on the generated error image, thereby generating an image $P^e_3$.

The first inverse quantization unit 532 and the first inverse transformation unit 534 perform first inverse quantization and first inverse transformation on the generated image $P^e_3$, thereby generating an image $P^{e'}_3$. The generated image $P^{e'}_3$ is input to the second motion estimation/compensation and secondary error image generating unit 552.

The second motion estimation/compensation and secondary error image generating unit 552 performs motion estimation and compensation on the input image $P^{e'}_3$ by referring to the image $P^{e'}_2$ stored in the second frame memory 550, thereby generating a secondary error image. The second transformation unit 562 and the second quantization unit 564 perform second transformation and second quantization on the generated secondary error image, thereby generating the secondary error image, i.e., an image $P^{e'e}_3$.

The generated image $P^{e'e}_3$ is input to the variable-length encoding unit 580 and the second inverse quantization unit 572.

After being variable-length encoded, the image $P^{e'e}_3$ input to the variable-length encoding unit 580 is transmitted to a decoder (not shown), together with a first motion vector obtained by the first motion estimation/compensation unit 542 and a second motion vector obtained by the second motion estimation/compensation unit 552.

The second inverse quantization unit 572 and the second inverse transformation unit 574 perform second inverse quantization and second inverse transformation on the image $P^{e'e}_3$ input to the second inverse quantization unit 572, thereby generating a reconstructed secondary error image, i.e., an image $P^{e'e'}_3$.

The generated image $P^{e'e'}_3$ is added to a reference image input from the second motion estimation/compensation and secondary error image generating unit 552, thereby generating a reconstructed error image, i.e., an image $P^{re'}_3$. The generated image $P^{re'}_3$ is stored in the second frame memory 550 to generate a secondary error image for the next frame. The generated image $P^{re'}_3$ is also input to the first adding unit 512 to generate a reference image for primary motion estimation/compensation of the next frame, i.e., an image $P^r_3$. The generated image $P^r_3$ is stored in the first frame memory 540.

In this way, by performing MC-DCT twice on each macroblock of the $P_3$ frame, i.e., performing motion estimation/compensation twice on generated error images, redundancy remaining in the error images can be removed.

In the current exemplary embodiment of the present invention, by performing motion estimation and compensation using secondary error images, i.e., error images generated by performing MC-DCT twice, compression efficiency is improved. However, compression efficiency may be improved by performing motion estimation and compensation using error images generated by performing MC-DCT three times or more.

Figure 6:
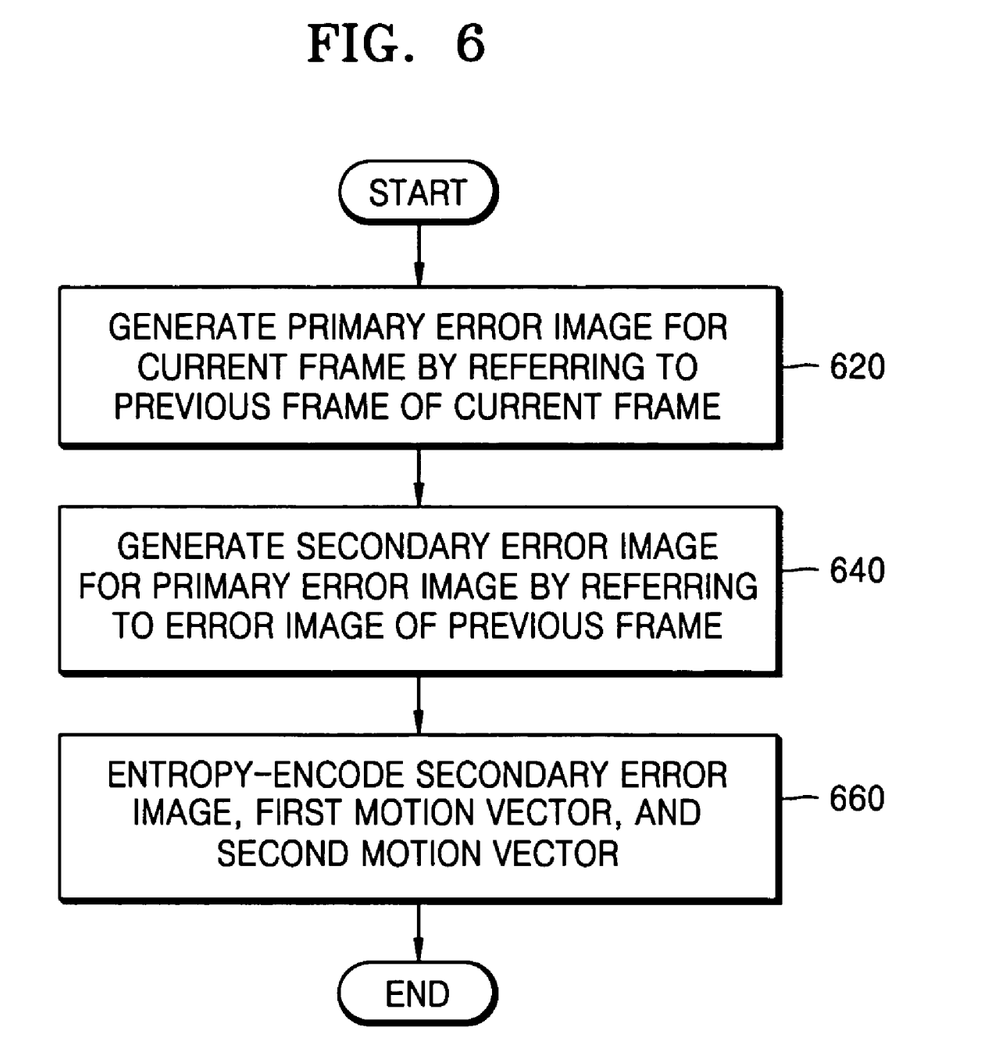
FIG. 6 is a flowchart illustrating an encoding method, implemented by the video encoder of FIG. 5, according to an exemplary embodiment of the present invention.

FIG. 6 is a flowchart illustrating an encoding method implemented by the video encoder of FIG. 5. In the following description, for convenience of explanation, in the entire encoding process of the video encoder of FIG. 5, only a process of encoding the $P_3$ frame to which encoding according to an exemplary embodiment of the present invention is applied will be described.

In operation 620, motion estimation and compensation are performed on a current frame ($P_3$ frame) by referring to a previous frame ($P_2$ frame), thereby generating a primary error image, i.e., a frame $P^{e'}_3$, and obtaining a first motion vector. Although first encoding and second decoding are performed on an error image generated through motion estimation and compensation to obtain a primary error image in the video encoder of FIG. 5, the first encoding and the second decoding may be skipped.

In operation 640, motion estimation and compensation are performed on the primary error image of the current frame ($P_3$ frame) by referring to an error image of the previous frame ($P_2$ frame), thereby generating a secondary error image, i.e., a frame $P^{e'e'}_3$, and obtaining a second motion vector. Although second encoding and second decoding are performed on the primary error image generated through motion estimation and compensation to obtain a secondary error image in the video encoder of FIG. 5, the second encoding and the second decoding may be skipped. Here, the error image of the previous frame is an error image, i.e., an image $P^e_2$, which is obtained by performing motion estimation and compensation on the image ($P_2$ frame) with reference to the previous frame ($I_1$ frame) of the image ($P_2$ frame).

In operation 660, entropy-encoding is performed on the secondary error image obtained in operation 640, the first motion vector obtained through motion estimation and compensation in operation 620, and the second motion vector obtained through motion estimation and compensation in operation 640.

Here, when the secondary error image is transmitted to the decoder, since both the first motion vector obtained in the generation of the primary error image and the second motion vector obtained in the generation of the secondary error image are required, it may be preferable that only the first motion vector obtained in the generation of the primary error image and the primary error image are transmitted to the decoder in terms of compression efficiency.

Thus, after a sum of the first motion vector obtained in the generation of the primary error image and the amount of data of the primary error image is compared with a sum of the first motion vector obtained in the generation of the primary error image, the second motion vector obtained in the generation of the secondary error image, and the amount of data of the secondary error image, only data having higher compression efficiency may be entropy-encoded and transmitted to the decoder. In this case, mode information indicating which data is encoded and transmitted is also transmitted. Such an embodiment will be described with reference to FIG. 7.

Figure 7:
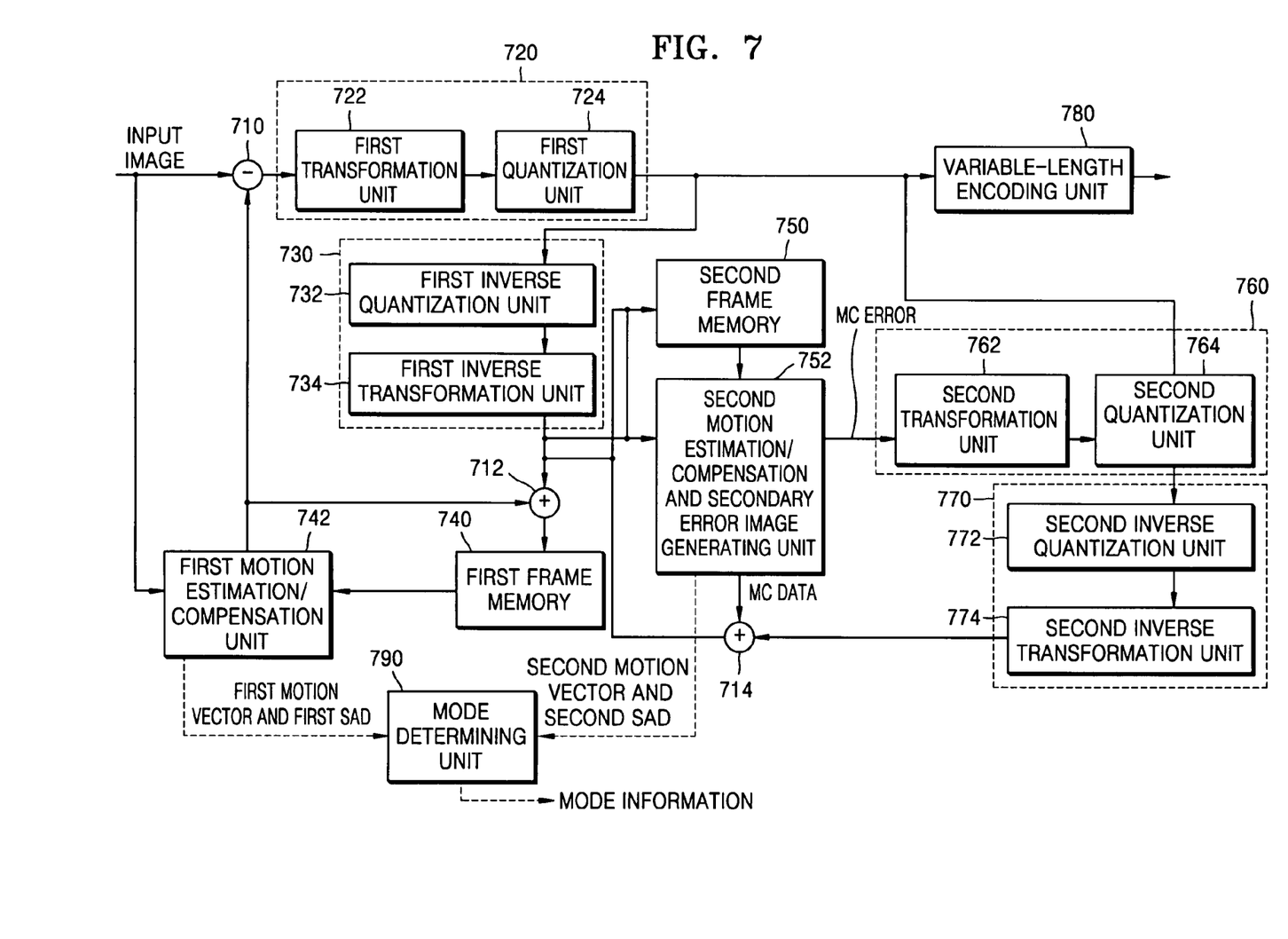
FIG. 7 is a block diagram of a video encoder according to an exemplary embodiment of the present invention.

FIG. 7 is a block diagram of a video encoder according to an exemplary embodiment of the present invention. The video encoder includes a subtraction unit 710, a first encoding unit 720, a first decoding unit 730, a first adding unit 712, a first frame memory 740, a first motion estimation/compensation unit 742, a second frame memory 750, a second motion estimation/compensation and second error image generating unit 752, a second encoding unit 760, a second decoding unit 770, a second adding unit 714, a variable-length encoding unit 780, and a mode determining unit 790. The first encoding unit 720 includes a first transform unit 722 and a second quantization unit 724. The first decoding unit 730 includes a first inverse quantization unit 732 and a first inverse transformation unit 734. The second encoding unit 760 includes a second transformation unit 762 and a second quantization unit 764. The second decoding unit 770 includes a second inverse quantization unit 772 and a second inverse transformation unit 774.

The remaining functional units of the video encoder except for the mode determining unit 790 function in the same way as corresponding functional units of the video encoder of FIG. 5 and another explanation thereof will not be given.

The mode determining unit 790 according to the exemplary embodiment of the present invention determines an encoding mode for input image data based on the first motion vector, the second motion vector, and a first sum of absolute differences (SAD), and a second SAD input from the first motion estimation/compensation unit 742 and the second motion estimation/compensation and secondary error information generating unit 752 and transmits the determined mode information to the variable-length encoding unit 580. The mode determining unit 790 determines an encoding mode in which the amount of data is minimized, i.e., compression efficiency is improved.

For example, first mode information indicates that information included in a bitstream is primary error information and a first motion vector. Second mode information indicates that information included in a bitstream is encoded secondary error information, a first motion vector, and a second motion vector.

A variable-length encoding target is determined for each macroblock according to the determined mode. In the exemplary embodiment of the present invention, mode selection may be made by using a linear combination of the amount of bit generation of a motion vector and an SAD. In another exemplary embodiment of the present invention, the amount of bit generation in the actual variable-length encoding of error information may be used instead of an SAD.

Figure 8:
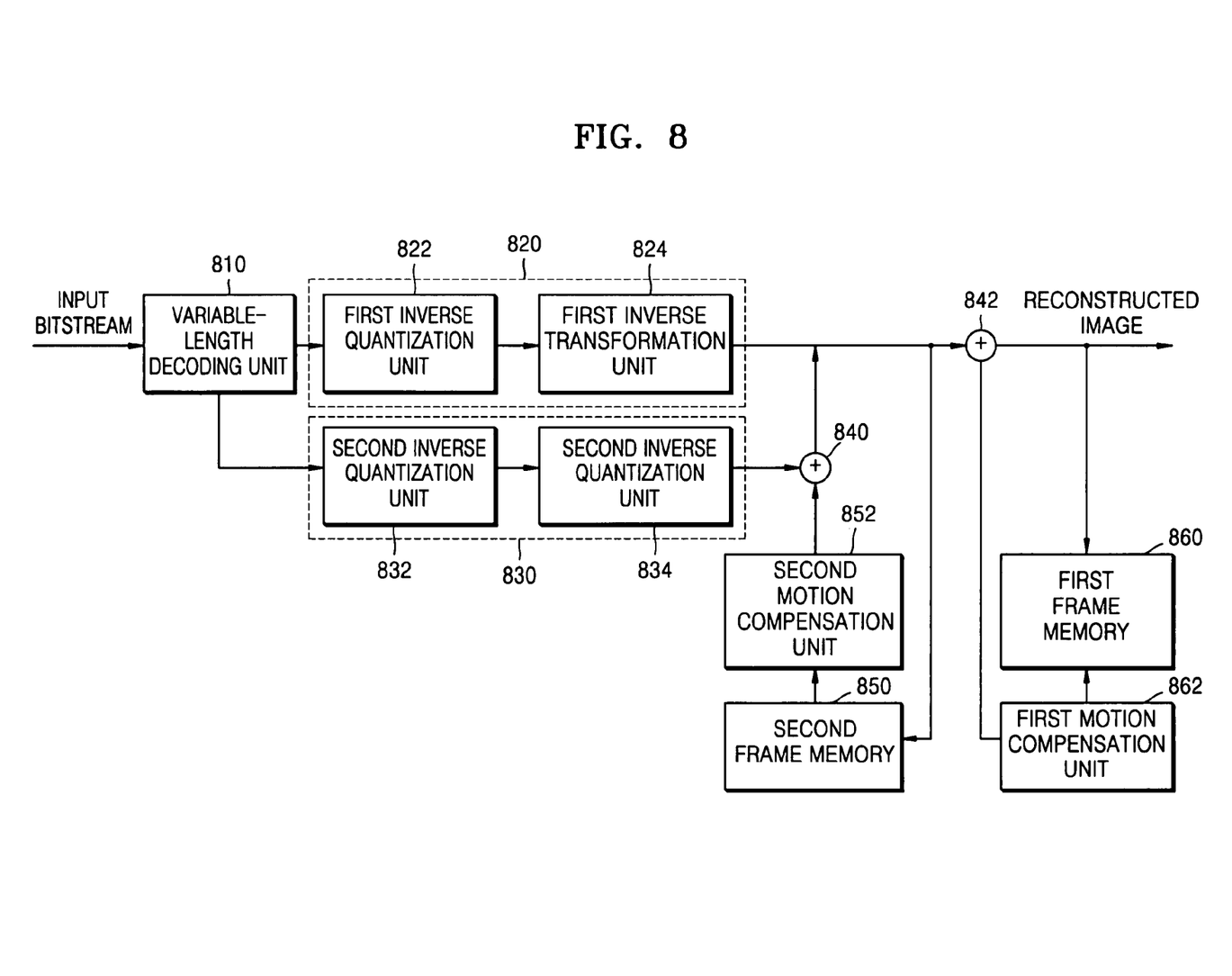
FIG. 8 is a block diagram of a video decoder according to an exemplary embodiment of the present invention.

FIG. 8 is a block diagram of a video decoder according to an exemplary embodiment of the present invention.

The video decoder includes a variable-length decoding unit 810, a first decoding unit 820, a second decoding unit 830, a first adding unit 840, a second adding unit 842, a second frame memory 850, a second motion compensation unit 852, a first frame memory 860, and a first motion compensation unit 862. The first decoding unit 820 includes a first inverse quantization unit 822 and a second inverse transformation unit 824. The second decoding unit 830 includes a second inverse quantization unit 832 and a second inverse transformation unit 834.

In the following description, $I_1$, $P_2$, $P_3$, $P_4$, and $P_5$ frames are encoded images in an input bitstream.

First, the $I_1$ frame that is variable-length decoded by the variable-length decoding unit 810 passes through the first inverse quantization unit 820 and the first inverse transformation unit 822, thereby generating a decoded error image. A reconstructed image $I'_1$ is generated through conventional intra-decoding and is then stored in the first frame memory 860 for decoding of the next frame.

Next, the $P_2$ frame that is variable-length decoded by the variable-length decoding unit 810 passes through the first inverse quantization unit 822 and the first inverse transformation unit 824, thereby generating a decoded error image $P^{e'}_2$. The generated image $P^{e'}_2$ is stored in the second frame memory 850 for decoding of the next frame. A reconstructed image $P'_2$ is generated based on the generated decoded error image $P^{e'}_2$ and the image $I'_1$ stored in the first frame memory 860 and the generated image $P'_2$ is stored in the first frame memory 860 for decoding of the next frame.

The $P_3$ frame that is variable-length decoded by the variable-length decoding unit 810 passes through the second inverse quantization unit 832 and the second inverse transformation unit 834, thereby generating a decoded secondary error image $P^{e'e'}_3$. Whether to perform decoding a variable-length decoded frame by the first inverse quantization unit 822 and the first inverse transformation unit 824 or the second inverse quantization unit 832 and the second inverse transformation unit 834 is determined according to mode information obtained by variable-length decoding a bitstream.

A reconstructed primary error image $P^{re'}_3$ is generated based on the generated secondary error image $P^{e'e'}_3$ and the generated error image $P^{e'}_2$ stored in the second frame memory 850. The generated primary error image $P^{re'}_3$ is stored in the second frame memory 850 for decoding of the next frame. A reconstructed image $P'_3$ is generated based on the generated decoded error image $P^{re'}_3$ and the image $P'_2$ stored in the first frame memory 860. The generated image $P'_3$ is stored in the first frame memory 860 for decoding of the next frame.

The following $P_4$ and $P_5$ frames are decoded in the same way as the $I_1$, $P_2$, and $P_3$ frame and another explanation thereof will not be given.

Figure 9:
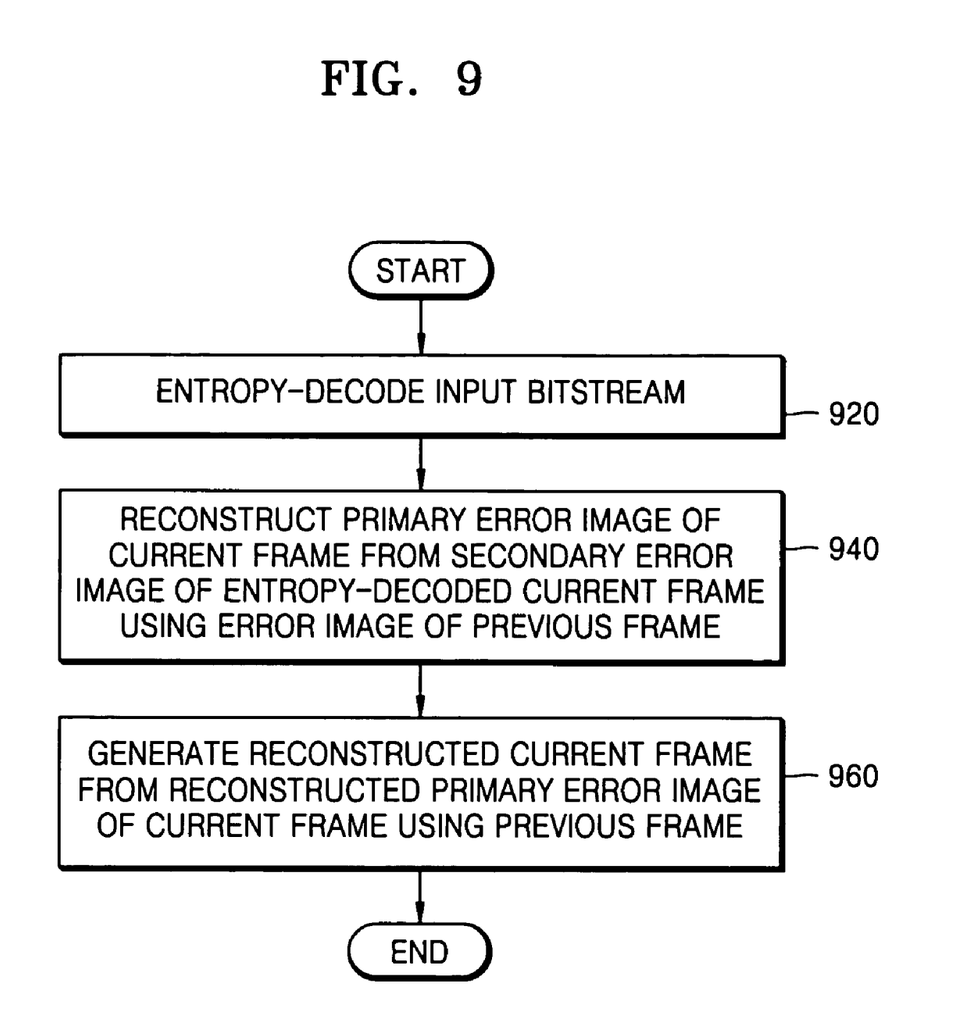
FIG. 9 is a flowchart illustrating a decoding method, implemented by the video decoder of FIG. 8, according to an exemplary embodiment of the present invention.

FIG. 9 is a flowchart illustrating a decoding method implemented by the video decoder of FIG. 8. In the following description, for convenience of explanation, in the entire encoding process of the video decoder of FIG. 8, only a process of decoding the $P_3$ frame to which encoding according to an exemplary embodiment of the present invention is applied will be described.

In operation 940, a motion estimated and compensated error image of a previous frame ($P_2$ frame) is added to a secondary error image of an entropy-decoded current frame ($P_3$ frame), thereby reconstructing a primary error image of the current frame ($P_3$ frame). Here, the reconstructed primary error image is generated by performing motion estimation and compensation on the current frame ($P_3$ frame) by an encoding unit with reference to the previous frame ($P_2$ frame). The secondary error image is generated by performing motion estimation and compensation on the generated primary error image with reference to an error image of the previous frame ($P_2$ frame). Although the secondary error image is obtained by decoding an error image obtained through entropy decoding in the video decoder of FIG. 8, the decoding may be skipped.

In operation 960, a motion estimated and compensated previous frame ($P_2$ frame) is added to the reconstructed primary error image of the current frame ($P_3$ frame), thereby generating a reconstructed current frame.

Operation 920 of entropy-decoding an input bitstream, extracting mode information, and performing decoding adaptively according to the extracted mode information may be further included.

The present invention can also be applied to a B frame. A secondary error image may be obtained by performing motion estimation and compensation on a current error frame with reference to two error images among error images of frames adjacent to a current frame.

As described above, according to the present invention, redundancy remaining in interframe images is removed by performing second motion estimation and compensation between a previous interframe and a current interframe, thereby improving compression efficiency.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video decoding method comprising:
   adding, by a processor, an error image of a motion estimated and motion compensated previous frame to a secondary error image of an entropy-decoded current frame to reconstruct a primary error image of the current frame; and
   adding, by the processor, the motion estimated and motion compensated previous frame to the reconstructed primary error image of the current frame to generate a reconstructed current frame,
   wherein the primary error image is generated by performing motion estimation and motion compensation on the current frame with reference to the previous frame and the secondary error image is generated by performing motion estimation and motion compensation on the primary error image when the previous frame is encoded.

2. The video decoding method of claim 1, wherein the generation of the primary error image of the current frame comprises:
   entropy-decoding the primary error image of the previous frame;
   performing first decoding on the primary error image of the previous frame that is entropy-decoded;
   storing the primary error image of the previous frame that passes through the first decoding;
   performing second decoding on the secondary error image that is entropy-decoded; and
   performing motion estimation and motion compensation on the error image of the previous frame stored after the first decoding and adding the motion estimated and motion compensated error image of the previous frame to the secondary error image that is subjected to the second decoding.

3. The video decoding method of claim 2, wherein the first decoding comprises
   performing first inverse quantization and performing first inverse transformation on an image that is subjected to the first inverse quantization, and the second decoding comprises performing second inverse quantization and performing second inverse transformation on an image that is subjected to the second inverse quantization.

4. The video decoding method of claim 1, further comprising:
   entropy-decoding an input bitstream and extracting mode information; and
   determining whether to perform the first decoding or the second decoding on the entropy-decoded bitstream based on the extracted mode information.

5. A video decoder comprising:
   a primary error image reconstructing unit which adds an error image of a motion estimated and motion compensated previous frame to a secondary error image of an entropy-decoded current frame to reconstruct a primary error image of the current frame; and
   an image reconstructing unit which adds the motion estimated and motion compensated previous frame to the reconstructed primary error image of the current frame to generate a reconstructed current frame,
   wherein the primary error image is generated by performing motion estimation and motion compensation on the current frame with reference to the previous frame and the secondary error image is generated by performing motion estimation and motion compensation on the generated primary error image when the previous frame is encoded.

6. The video decoder of claim 5, wherein the primary error image reconstructing unit comprises:
   a first decoding unit which entropy-decodes the primary error image of the previous frame and performs first decoding on the primary error image of the previous frame that is entropy-decoded;
   a first storing unit which stores the primary error image of the previous frame that passes through the first decoding;
   a second decoding unit which performs second decoding on the secondary error image that is entropy-decoded; and
   a secondary error image reconstructing unit which performs motion estimation and motion compensation on the primary error image of the previous frame stored after the first decoding and adds the motion estimated and motion compensated error image of the previous frame to the secondary error image that is subjected to the second decoding.

7. The video decoder of claim 6, wherein the first decoding unit comprises a first inverse quantization unit which performs first inverse quantization and a first inverse transformation unit which performs first inverse transformation on an image that passes through the first inverse quantization, and wherein the second decoding unit comprises a second inverse quantization unit which performs second inverse quantization and a second inverse transformation unit which performs second inverse transformation on an image that passes through the second inverse quantization.

8. The video decoder of claim 7, further comprising:

a mode information extracting unit which entropy-decodes an input bitstream and extracts mode information; and a mode determining unit which determines whether to perform the first decoding or the second decoding on the entropy-decoded bitstream based on the extracted mode information.

9. The video decoder of claim 6, further comprising:

a mode information extracting unit which entropy-decodes an input bitstream and extracts mode information; and a mode determining unit which determines whether to perform the first decoding or the second decoding on the entropy-decoded bitstream based on the extracted mode information.

10. A computer-recordable recording medium having recorded thereon a program for implementing a video decoding method, the video decoding method comprising:

adding an error image of a motion estimated and motion compensated previous frame to a secondary error image of an entropy-decoded current frame to reconstruct a primary error image of the current frame; and adding the motion estimated and motion compensated previous frame to the reconstructed primary error image of the current frame to generate a reconstructed current frame, wherein the primary error image is generated by performing motion estimation and motion compensation on the current frame with reference to the previous frame and the secondary error image is generated by performing motion estimation and motion compensation on the primary error image when the previous frame is encoded.

* * * * *